United States Patent [19]

Redfern et al.

[11] 4,163,802

[45] Aug. 7, 1979

[54] PREPARATION OF YOGURT

[75] Inventors: Robert B. Redfern; Samir F. Rizk, both of Raleigh, N.C.

[73] Assignee: Pine State Creamery Company, Raleigh, N.C.

[21] Appl. No.: 774,415

[22] Filed: Mar. 4, 1977

[51] Int. Cl.$^2$ ............................................... A23C 9/12
[52] U.S. Cl. ........................................ 426/43; 426/34; 426/583
[58] Field of Search ...................... 426/34, 42, 43, 583, 426/422

[56] References Cited

U.S. PATENT DOCUMENTS

| | | | |
|---|---|---|---|
| 1,619,016 | 3/1927 | Duclaux | 426/422 X |
| 3,128,190 | 4/1964 | Donay et al. | 426/43 |
| 3,269,842 | 8/1966 | Mayer et al. | 426/43 |
| 3,932,680 | 1/1976 | Egli et al. | 426/43 |

FOREIGN PATENT DOCUMENTS 1144091  2/1963  Fed. Rep. of Germany ............. 426/43

OTHER PUBLICATIONS

Webb et al., Byproducts From Milk, 2nd ed., The Avi Publishing Co. Inc., Westport, Conn. 1970, (pp. 37–40).

*Primary Examiner*—David M. Naff
*Attorney, Agent, or Firm*—Mills & Coats

[57] ABSTRACT

A yogurt base is prepared and combined with a sweetened mix base to produce a yogurt product. The yogurt base can be shipped from the processing plant to retail outlets in a liquid, nonfrozen state. Flavoring can be added to the base yogurt at the retail outlet to give greater versatility to the retailer while eliminating the logistical problem of multiflavored shipments.

7 Claims, No Drawings

PREPARATION OF YOGURT

This invention relates to food products and the process for preparing the same and more particularly to yogurt type products including those adapted to be served in a soft frozen state.

The food commonly known as yogurt or variations thereof have been known since ancient times. In recent years, pasteurized yogurt has become widely used as a dessert particularly among nutrient conscious persons. This dessert has been made available in numerous flavors but because of a certain tartness due to acidity it has not been as widely accepted as its nutritional value would indicate as desirable.

The most recent development in the yogurt field has been the dispensing of the product through soft served type ice cream dispensers. Because of the "ice cream" connotation, soft served yogurt has become very popular in many areas of the country. Almost universally the yogurt dispensed in soft served form has been prepared as a hard freeze mix and shipped as such. This has been thought necessary because the distances between the processing plant and the retail outlets in many cases is extensive and unfrozen yogurt of the type that can be used in soft served machines has up to now had a relatively short shelf life (usually only a few days) in unfrozen but refrigerated form.

Some of the problems encountered in hard freeze shipment of yogurts intended for soft served use are, among other things, the short shelf life after thawing, the slight lumpness which developes that clogs the dispensing machines and requires periodic cleaning of the same; a thawing time of at least 24 hours at room temperature being required before use which makes a readily available supply source questionable; and the various flavors which have almost universally been premixed at the processing plant thus creating inventory, stocking and shipping problems.

Some attempts have also been made to produce a frozen yogurt for over the counter sale as on ice cream type products. Invariably because of the consistency of the product ice particles have formed during the freezing process making the product grainy in consistency and the same has not met with substantial success in the marketplace.

After much research and study into the above-mentioned problems, a yogurt product has been developed which is particularly adapted to be dispensed from soft freeze dispensers, that has a nonfrozen shelf life of 3 to 4 weeks, and is of proper consistency and acidity to receive desired flavorings at the retail dispense locations. Also this product has a smooth consistency and can be sold as a hard frozen "ice cream" type product.

In view of the above, it is an object of the present invention to provide a yogurt mix which can be used in soft freeze dispensing machines, which can be shipped in liquid form, and which has a shelf life of between 3 and 4 weeks.

Another object of the present invention is to provide a yogurt type food product which is formed by a special yogurt formulation combined with a special sweetened formulation to form a more palatable product which is suitable for soft freeze dispensing.

Another object of the present invention is to provide a yogurt type product which can be shipped to retail outlets in either frozen or liquid form without developing the undesirable characteristics heretofore commonly found in such products.

A further object of the present invention is to provide a yogurt type product formed from the admixture of a yogurt base, a sweetened base, and added ascorbic acid to form a consistent pH factor of between 3.9 and 4.1.

An even further object of the present invention is to provide a yogurt type food product which can be shipped in unflavored form with the desired flavorings being added at the retail outlet prior to dispensing.

Another object of the present invention is to provide a liquid shipped unflavored yogurt product suitable for soft freeze dispensing with flavoring being added at the retail outlet.

Another object of the present invention is to provide a yogurt type product having a natural yogurt flavor which is obtained by bacterial action with a maximum flavor release due to low sugar level in the yogurt base.

Another object of the present invention is to provide a yogurt type food prouct which can be processed on all types of soft served freezers without clogging and without developing a grainy consistency.

Other objects and advantages of the present invention will become apparent and obvious from a study of the following description which is merely illustrative of such invention.

With further reference to the details of the present invention, the process for preparing the yogurt type food product is preferably accomplished in three basic steps. These three steps have been found to be necessary to produce a natural tasting yogurt product which can be both soft frozen served and hard frozen served.

In the following detailed description of the yogurt type food product and the process for preparing the same, the terms "soft served" will mean the product is soft frozen as it is dispensed from a soft served ice cream dispensing machine. The term "hard served" will be referring to the yogurt product frozen to a consistency of regular ice cream.

The process for preparing the yogurt of the present invention is accomplished in three basic steps, (1) the preparing of the yogurt base, (2) the preparing of the sweetener base and (3) the mixing of the two bases to form the finished base product.

In the following examples of the yogurt type food product of the present invention, it is to be understood that the amounts are approximate and that reasonable variations therein can be made without substantially reducing the quality thereof. Substantial variations from the examples, however, will result in an inferior product with possible undesirable or even unusable characteristics.

I. YOGURT BASE

The following ingredients and process are used in preparing a preferred embodiment of the yogurt base, the ingredients being for a 100 gallon bath having a weight of 9.2 pounds per gallon.

Ingredients (46%) 423 lbs. of 3.3% butterfat whole milk
(41.3%) 380 lbs. of fresh skim milk
(4.9%) 45 lbs. of Extra Grade A Lo-Heat spray dried skim milk powder
(7.3%) 67.5 lbs. of liquid cane sugar having solids of 67.5%

(0.5%) 4 lbs. of stabilizer, preferably including dextrin, Locust Bean Gum, Guar Gum, Carrageenan, Mono and Di-Glycerides and gelatin.

Process

The whole milk is pumped into a standard weigh tank of suitable construction. Skim milk powder is blended into the fresh skim milk by use of a blender at 5000 to 6000 RPM. A Lanco Brand Blender Model LDD having a 100 gallon capacity has been found acceptable for this mixing purpose. The mixture is then pumped into the weigh tank. The stabilizer can then be mixed with liquid cane sugar as the sugar is metered into the Lanco blender. The sugar-stabilizer mixture is then pumped into the weigh tank. At this point the weight is checked along with the fat content and a solid totals test is made.

Next the mixture is pasteurized in a high temperature short time pasteurizer (H.T.S.T.) at 180° to 190° Fahrenheit with a holding time of 35 seconds. Homogenization (Homo) follows in a two stage process at 2500-3000 P.S.I. for the first stage and 500 P.S.I. for the second stage. The H.T.S.T. pasteurizer is also used to cool the mixture to between 70° and 76° Fahrenheit.

The product is then pumped into a round processing vat preferably of the cone bottom type equipped with hot water heating and ice water cooling systems. This vat should preferably be of the type that has three heating and cooling sections to provide uniform thermal treatment. The agitator should be equipped with the side wall scrappers to further facilitate uniform heat transfer. Additionally the agitation should have control speeds of between 15 RPM and 30 RPM.

Once in the round processing vat, the yogurt base is treated at between 180° to 190° Fahrenheit for 10 to 30 minutes. This has been found necessary to get the maximum stabilization effect of the whey proteins which are separated at this high temperature. This heat treatment also liberates amino acids from the milk proteins. These acids enhance the growth of lactobacillus bulgaricus which subsequently break down the milk protein and yield other amino acids which stimulate the growth of streptococcus thermophilus. These two bacteria are initially equal in population number which is most important for proper yogurt flavor development.

The product is then cooled to between 110° to 114° Fahrenheit at which time a yogurt culture is added at the rate of between 1.5% to 2.5%. This has been found to be necessary for fast acid development which prevents grainy or sandy texture in the finished product. While at this relatively high temperature the inoculum must not exceed 3%, otherwise the result would be whey separation and the coarse texture referred to. The incubation period should continue until a pH of from 4.2 to 4.4 is obtained. This incubation time usually ranges from 2.5 to 4 hours.

It should be noted at this point that when the product is being heated and cooled, agitators must be set at high speed.

Following the incubation period, ice water cooling is begun and the agitator set at high speed to cool the yogurt base to between 40° and 45° Fahrenheit. It is necessary to cool to this temperature to prevent development of excessive acidity.

The yogurt base is now completed and if the second portion of the manufacturing process is to be immediately accomplished, the agitator can be turned on slow. If production scheduling makes it necessary, a 1 or 2 day delay can be accepted and in such case the agitator is turned off and the ice water drained from the vat jacket.

II. SWEETENED BASE

The following ingredients and process are used in preparing a preferred embodiment of the sweetened base, the ingredients being for a 100 gallon batch having a weight of 9.3 lbs. per gallon.

Ingredients (21.4%) 200 lbs. of 3.3% butterfat whole milk
(3%) 28.5 lbs. of 40% cream with a fresh acidity of 0.09 to 0.12
(6.7%) 62.5 lbs. of Extra Grade A Lo-Heat spray dried skim milk powder
(3%) 28 lbs. of Extra Grade A spray dried whey
(55.8%) 520.8 lbs. of liquid cane sugar having solids of approximately 67.5%
(3.9%) 36 lbs. of stabilizer preferably including Dextrin, Locust Bean Gum, Carrageenan, Mono and Di-Glycerides and gelatin
(6.2%) 57.5 lbs. of water

Process

The whole milk is pumped into a weigh tank similar to the weigh tank used in preparation of the yogurt base. The skim milk powder and whey powder is blended into the fresh skim milk by use of a Lanco type blender operating at between 5000 and 6000 RPM. This mixture is then pumped into the weigh tank. The stabilizer is then mixed with the liquid cane sugar as the sugar is metered into the blender. Once mixed the sugar and stabilizer admixture is pumped into the weigh tank. At this point the total weight is checked and fat and total solids tests are made.

The sweetened base is then pasteurized and homogenized by the same process that was used for the yogurt base. Once this is completed the sweetened base is cooled to between 38 and 40° Fahrenheit.

FINAL PROCESS

Ingredients

Yogurt base
Sweetener base
Natural ascorbic acid (Vitamin C)
Vanilla flavoring

Process

To the yogurt base in the round bottom processing vat hereinabove referred is added the sweetener base in proportions of 60-40 yogurt to sweetener. It should be noted at this point that other proportions have been experimented with such as 50-50, 65-35, and 70-30 but invariably the best results in obtaining maximum yogurt taste and dryness, particularly for preparation of a soft frozen product, was found to be 60-40.

The combined yogurt base and sweetener base are mixed with the vat agitator at slow speed, i.e., 15 RPM, for 15 to 25 minutes to gain maximum product uniformity.

The pH is again checked and is adjusted to between 3.9 and 4.1 with a 50% solution of natural ascorbic acid in the form of Vitamin C. This step is necessary to assure consistency between batches. The natural yogurt flavor is, of course, derived by the bacterial action of the yogurt culture. The ascorbic acid is added primarily for fortification and uniformity.

Fat test and total solids tests are also made at this point. If all ingredients have been correctly measured, the fat content should be between 1.9 and 2% and the total solids from 30% to 32%. The optimum in fat content and solids is 2% and 31.5% respectively.

Ten ounces (0.00625%) of pure vanilla flavoring per 100 gallons of finished product has been found to further enhance the total flavor and can be added at this point.

The process of preparing the yogurt type food product is now completed except for one final step. As the product is transferred from the vat to the packaging machine, it is passed through a pair of filters. These filters are referred to as sanitary inserts and are preferably made from nylon and cardboard. The mesh of the filters is 1 mm. sq. with approximately 26 squares per inch. This final filtering of the product has been found to prevent gumminess or precipitates in the finished product. Many products dispensed through soft served freezers tend to clog or plug the same necessitating complete disassembly and washing of the freezer parts. If this interruption occurs at peak selling hours the loss of revenue to the retailer can be great. Although much research has been conducted in efforts to prevent these problems, the present simple and yet effective filtering means at the packaging station accomplishes the desired result without complex reprocessing procedures which are questionable at best.

The process, expressed as percentage by weight, of preparing a yogurt base for combination with a sweetener base to form an improved yogurt food product is as follows: blending approximately 4.9% by weight dried skim milk powder with approximately 41.3% by weight fresh skim milk; adding said blend to approximately 46% by weight whole milk; blending approximately 0.5% by weight stabilizer with approximately 7.3% by weight liquid cane sugar; combining said second mentioned blend with said mixture; pasteurizing and homogenizing a said combined mixture; cooling the combined mixture to between 11D° and 114° Fahrenheit, adding a yogurt culture at the rate of between 1.5% and 2.5%; allowing the combined mixture to stand between 2.5 and 4 hours until a pH of between 4.2 and 4.4% is obtained; and cooling said combined mixture to between 40°and 45° Fahrenheit whereby an improved yogurt base is provided.

As a final quality control check, samples are taken at the packaging station and checked bacteriologically (coliform) and for proper viscosity. Relative to this second check, the desired viscosity is a flow of 50 mls. Through a 2 mm. opening at 60° Fahrenheit in 25 to 35 seconds. Simple viscosity samplers are available for this purpose and further structural discussion of the same is not deemed necessary.

If the yogurt product produced in accordance with the above process is in storage for 10 days or more, a second viscosity test should be made. Using the criteria detailed above, the flow time should not exceed 40 seconds.

In the separate production of the yogurt base and the sweetener base, the yogurt is allowed to reach the desired natural acidity without the inhibitory effect of high level sugar content. This has been found extremely important to obtain peak flavor release. The two basic process procedures allow natural acidity to be achieved.

It should be noted that no flavoring other than the small amount of vanilla is added to the yogurt product during manufacture and packaging. This is unique and greatly reduces the inventory retailers must maintain as well as reducing the shipping logistics required in pre-flavored yogurts. By shipping the product in containers as small as one-half gallon cartons, the retailer has complete flexibility as to the operation of his soft freeze dispenser. Also the product is immediately available for dispensing by eliminating the 24 hour thawing period required by hard frozen shipped yogurts. Also the soft served retailer does not have to maintain a storage area between $-10°$ and $-20°°$ Fahrenheit for the hard freeze storage since the product of the present invention has a shelf life of 3 to 4 weeks at temperatures in the range of 40° Fahrenheit.

Natural essence flavors such as strawberry, raspberry, peach, chocolate, etc., are added by the retailer at or just before he places the yogurt product in the soft freeze machine thus eliminating loss of products which are purchased preflavored in flavors that do not sell well.

In view of the above, it is obvious that the present invention has the advantage of providing a superior yogurt product that can be shipped and stored in liquid, unfrozen form and has a shelf life of 3 to 4 weeks. Ordering of this product is simplified by the desired flavorings being added at the retail outlet rather than the processing plant. The present invention also has the advantage of providing a smooth, nongrainy, nonclogging yogurt product which is suitable for soft frozen served applications and is adapted to be used in all present commercial soft served machines.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced herein.

What is claimed is:

1. A sweetener base for combination with a yogurt base to form an improved yogurt food product comprising, in approximate proportions by weight: 21.4% whole milk containing approximately 3.3% butterfat, 3% cream, 6.7% skim milk powder, 3% dried whey, 55.8% liquid cane sugar having approximately 67.5% solids, 3.9% stabilizer, and 6.2% water whereby when said sweetener base is combined with a yogurt base, a yogurt type food product is provided.

2. The process of preparing a yogurt base and combining it with a sweetener base to form an improved yogurt food product comprising: blending approximately 4.9% by weight dried skim milk powder with approximately 41.3% by weight fresh skim milk; adding said blend to approximately 46% by weight whole milk; blending approximately 0.5% by weight stabilizer with approximately 7.3% by weight liquid cane sugar; combining said second mentioned blend with said mixture; pasteurizing and homogenizing said combined mixture; cooling the combined mixture to between 110° and 114° Fahrenheit; adding a yogurt culture at the rate of between 1.5% and 2.5%; allowing the combined mixture to stand between 2.5 and 4 hours until a pH of between 4.2 and 4.4 is obtained; cooling said combined mixture to between 40° and 45° Fahrenheit to provide said yogurt base; and adding to said yogurt base a sweetener base including in approximate proportions by weight, 21.4% whole milk containing approximately 3.3% butterfat, 3% cream, 6.7% skim milk powder, 3% dried whey, 55.8% liquid cane sugar having approximately 67.5% solids, 3.9% stabilizer, and 6.2% water whereby an improved yogurt is provided.

3. The process of claim 2 including adding to the combined yogurt and sweetener base natural ascorbic acid to achieve a pH of between 3.9 and 4.1 in a final product.

4. The process of claim 3 wherein approximately 0.00625% by weight vanilla flavoring is added to the product whereby an improved yogurt food product is provided.

5. The process of claim 4 wherein said sweetener base includes ingredients in approximate proportions by weight; 21.4% whole milk containing approximately 3.3% butterfat, 3% cream, 6.7% skim milk powder, 3% dried whey, 55.8% liquid cane sugar having approximately 67.5% solids, 3.9% stabilizer, and 6.2% water.

6. The process of claim 2 including combining said yogurt base and said sweetener base in the proportions of 60-40 yogurt base to sweetener; and passing said products through a relatively large mesh sanitary filter.

7. The process of claim 6 wherein said filter is of a mesh type having openings therein of approximately 1 mm. sq.

* * * * *